Aug. 23, 1932.  E. H. BUNCE  1,873,861
CONDENSING ZINC VAPOR
Filed Oct. 16, 1929   2 Sheets-Sheet 1

INVENTOR
Earl H. Bunce
BY
Pennie, Davis, Marvin & Edmonds
ATTORNEYS

Aug. 23, 1932.   E. H. BUNCE   1,873,861
CONDENSING ZINC VAPOR
Filed Oct. 16, 1929   2 Sheets-Sheet 2

Patented Aug. 23, 1932

1,873,861

UNITED STATES PATENT OFFICE

EARL H. BUNCE, OF PALMERTON, PENNSYLVANIA, ASSIGNOR TO THE NEW JERSEY ZINC COMPANY, OF NEW YORK, N. Y., A CORPORATION OF NEW JERSEY

CONDENSING ZINC VAPOR

Application filed October 16, 1929. Serial No. 400,064.

This invention relates to the condensation of zinc vapor and has for its object the provision of an improved method of and apparatus for condensing zinc vapor. The invention is particularly adapted for the condensation of zinc vapor, or metal vapors high in metallic zinc content, from relatively large volumes of gases derived from a continuously operated reducing or redistillation furnace. More particularly, the invention aims to provide a method of and apparatus for efficiently condensing the zinc vapors produced by reducing or smelting an agglomerated charge in a vertical retort as described in the United States patent of Breyer and Bunce, No. 1,712,132, particularly in conjunction with the practice of stack-draft control described in the copending application of Frank G. Breyer, Serial No. 180,107, filed April 1, 1927.

The zinc vapor derived from a smelting or reducing operation is admixed with other gases, mainly carbon monoxide with some hydrogen and nitrogen. The function of the condenser is to efficiently condense the zinc vapor to a liquid coalesced state out of this mixture of gases. The condenser will best perform its contemplated function only when the following conditions are established and maintained:

1. The gas mixture entering the condenser during a given period of operation must be approximately uniform in volume and composition; and, in particular, must contain less than 1% of carbon dioxide or other oxidizing medium.

2. The gas mixture must be cooled to a temperature below the dew point of zinc vapor in that mixture, without, however, cooling to such an extent that blue powder is formed.

3. Any zinc condensed as a mist must be removed from the gas stream to form a bath of molten zinc before being cooled below the freezing point of the zinc, before leaving the condenser and before encountering any oxidizing medium such as carbon dioxide, oxygen or water vapor.

The dew point of the zinc vapor in the gas mixture depends on the proportion of zinc vapor in the gas mixture and on the gas pressure within the condenser. Thus, as the proportion of zinc vapor is decreased by condensation, the dew point is lowered and it becomes increasingly difficult to condense additional zinc without cooling to such an extent that blue powder is formed.

At the temperatures necessary for efficient condensation of zinc vapor, it is impossible to avoid the formation of some zinc oxide and/or blue powder from a mixture containing a large percentage of carbon monoxide. This is due to the fact that carbon monoxide decomposes into carbon and carbon dioxide at condensing temperatures. The resulting carbon dioxide thereupon reacts with the zinc vapor forming zinc oxide and/or blue powder.

The third requirement mentioned above makes it necessary to carefully consider the factors of turbulence, impingement, velocity, a limiting minimum temperature, certain surface-volume relationships and conditions of heat transfer.

The present invention is based upon an extended investigation and research of the factors and conditions influencing or affecting the condensation of zinc vapor, particularly from gas mixtures produced in zinc smelting or reducing operations. The method and apparatus of the invention provide for the esablishment and maintenance of these various requirements and factors most favorable to efficient condensation of zinc vapor. The novel features of the invention will be most readily understood from the following description taken in connection with the accompanying drawings, in which.

Figures 1, 2:
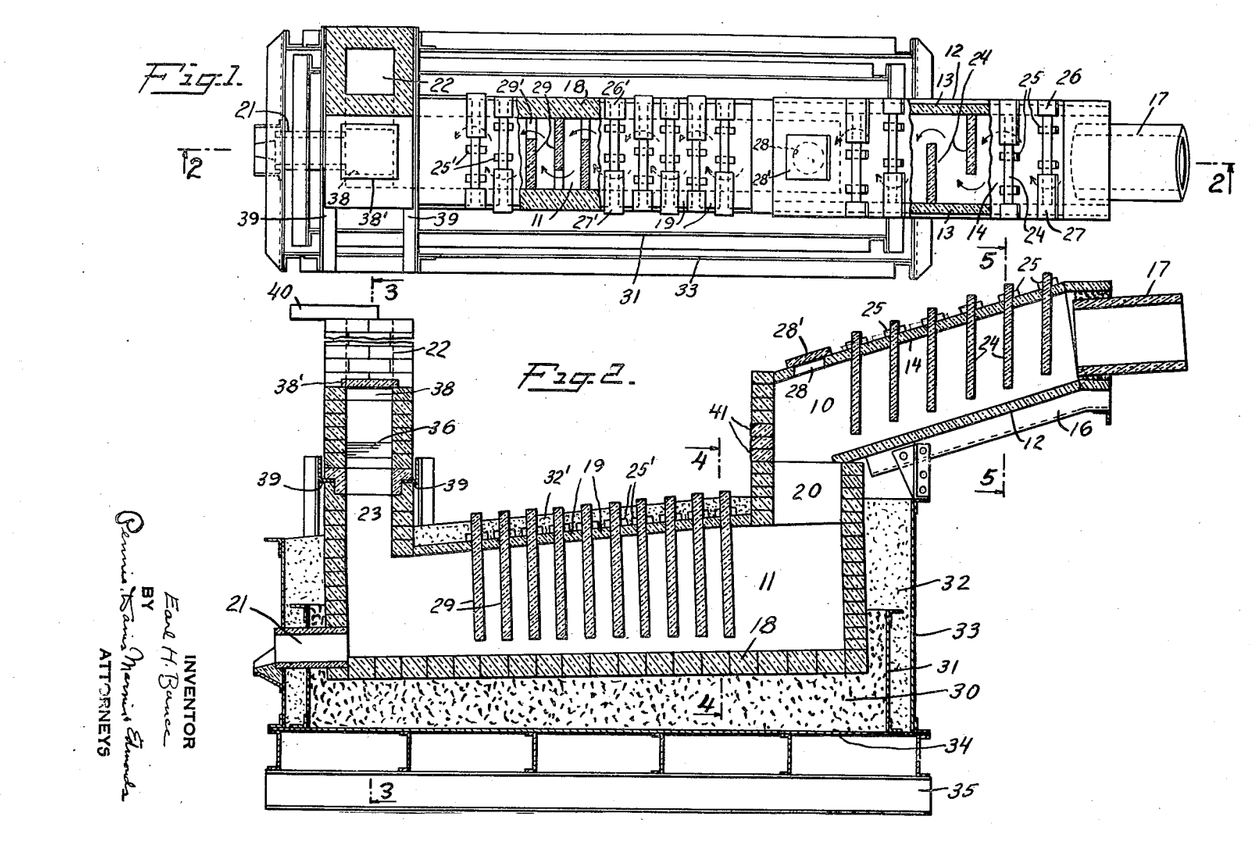
Fig. 1 is a top plan view, partly in section, of a condenser embodying the invention.
Fig. 2 is a sectional elevation of the condenser on the section line 2—2 of Fig. 1, and Figs. 3, 4 and 5 are sectional elevations on the section lines 3—3, 4—4, and 5—5, respectively, of Fig. 2.
Figure 5:
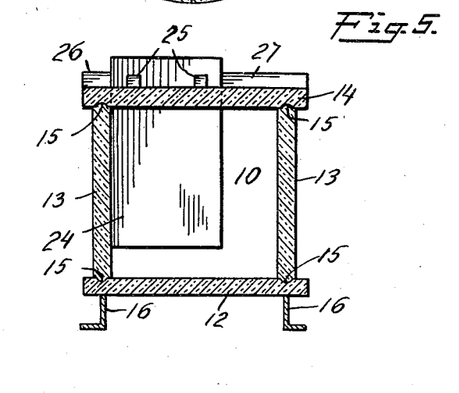

The condenser illustrated in the drawings has two condensing environments, namely, a condensing chamber 10 and a condensing sump 11. The chamber 10 is substantially square in cross section, and is built up of a flat bottom tile 12, flat side tiles 13 and spaced flat top tiles 14 (Figs. 1 and 5). The flat tiles should be made of a material not affected by zinc vapor or the other gases admixed therewith and having good heat conductivity so as to provide for the contemplated heat dissipation. Silicon carbide, or mixtures of silicon carbide with clay, have given very good results in practice. The flat tiles are preferably joined by tongue and groove joints 15 filled with an appropriate cement, such as silicon carbide cement, which will bond the joints and make them gas-tight at the temperatures attained in the operation of the condenser.

The bottom tile 12 is mounted in an inclined position on beams 16 secured to an appropriate supporting structure (not completely shown). A cylindrical orifice or gas inlet 17 connects the upper or higher end of the condensing chamber 10 with the source of zinc vapor, such as a smelting or redistillation furnace. The condensing chamber 10 thus operates on the down-draft principle, that is, the ultimate travel of the gas through the chamber is downwardly.

Figure 4:
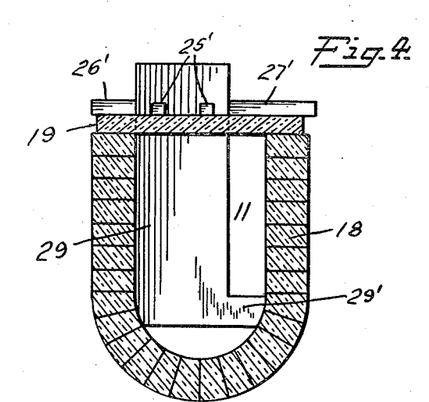

The condensing sump 11 is U-shape in cross section (Fig. 4) and its bottom, sides and ends are built up of brick, preferably silicon carbide or mixtures of silicon carbide with clay. In building up this brickwork structure (18), the brick are first treated on a revolving sand grinding table where all irregularities are eliminated. The contacting surfaces of the brick are cut smooth, whereby any faults covered over by the surface glaze are revealed and faulty brick are rejected. The brick are then laid with a high grade refractory cement, such as silicon carbide cement, which will bond the brick at the temperature at which the condenser operates.

The top of the condensing sump 11 is formed by spaced flat tiles 19 resting on the top of the side walls of the brick-work structure 18. The lower end of the condensing chamber 10 is connected with the condensing sump 11 by a vertical orifice or passage 20, preferably built up of brick or flat tile of silicon carbide. The semi-cylindrical bottom of the brickwork structure 18 of the condensing sump has a slight inclination from the end communicating with the condensing chamber towards the end provided with the molten metal tap hole 21.

Figure 3:
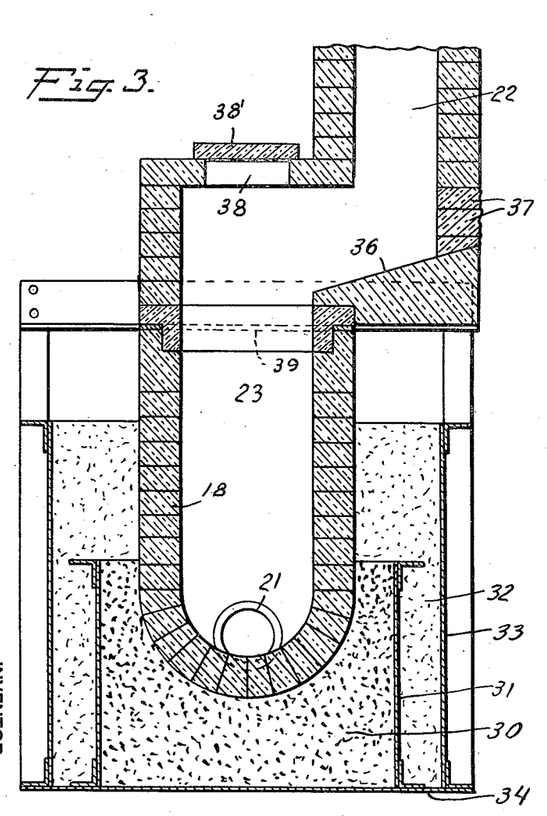

An exhaust stack 22 communicates with the condensing sump 11 at the end approximate the tap hole 21. The base of the stack 22 is off-set or laterally disposed with respect to the communicating opening in the top of the sump 11. Thus, the exhaust gases from the sump flow upwardly through the short vertical passage 23 and then laterally to the base of the stack 22 (Fig. 3). The base of the stack has a floor 36 inclined downwardly towards the passage 23, whereby any molten zinc condensing in the stack may flow back into the sump. Blue powder and the like settling on the inclined floor 36 may be scraped out from time to time through a clean-out opening in the base of the stack normally closed by loose brick 37 appropriately luted. A clean-out opening 38, normally closed by a tile 38', is provided in the top of the passage 23. The stack itself may advantageously be built of firebrick or the like, and to relieve the sump structure of its weight the stack is preferably independently supported on steel beams 39 which in turn are appropriately supported by the main platform.

Turbulence and impingement of the gas as it flows through the condensing chamber 10 is caused by appropriately proportioned and arranged baffles 24. These baffles extend through the spaces between the flat top tiles 14 into proximity with, but not entirely to, the flat bottom tile 12. At the upper end, each baffle has two openings in which pins 25 are inserted, the pins resting upon adjacent top tiles 14 and thereby holding the baffle properly suspended in the condensing chamber.

The baffles 24 are arranged to provide a tortuous side-to-side path for the gaseous stream in its travel through the condensing chamber. Thus, the baffles are slightly wider than half the width of the condensing chamber and adjacent baffles are positioned snug against the opposite side walls 13. Thus, alternate baffles will have one edge snug against one side wall 13 while the other baffles will have one edge snug against the other side wall 13. The spaces in the top of the chamber 10, between the tiles 14, not occupied by the baffles 24, are closed with short tiles 26 and long tiles 27. At the lower end of the chamber 10 a clean-out opening 28, normally closed by a tile 28', is provided directly over the orifice 20. The various tiles (14, 26, 27 and 28'), constituting the top or roof of the condensing chamber 10, may be covered with a shallow layer of dust coal or the like for heat insulation.

Turbulence and impingement of the gaseous stream in its travel through the condensing sump 11 is caused by a somewhat similar series of baffles 29 extending through the spaces between the flat top tiles 19. The baffles 29 are supported on adjacent tiles 19 by pins 25', and the spaces between the tiles 19, not occupied by the baffles, are closed by short tiles 26' and long tiles 27'. The baffles 29 are, for the most part, somewhat wider than half the width of the sump 11, but have a short lower portion 29' of the same width and configuration as the adjacent section of the sump 11. The baffles 29 are flat on the bottom and terminate a short distance above the lowest portion of the concave bottom of the sump 11. Adjacent baffles are positioned with their L-shaped edge adjacent opposite side walls of the sump so that a tortuous side-to-side path is provided through the sump for the gaseous stream. The tiles 19, 26' and 27', constituting the top of the sump 11, are covered with a layer 32' of dust coal, or the like, whose heat-insulating effect may be varied by increasing or decreasing its depth.

The semi-cylindrical portion of the brickwork structure 18 of the sump 11 rests on a bed of loam 30 appropriately confined within a steel casing 31. The casing 31 and the upper side and end walls of the brickwork structure 18 are surrounded by a layer of dust coal 32 appropriately confined within a steel casing 33. The casings 31 and 33 are mounted on a steel platform 34 supported on an appropriate framework 35. The layer of dust coal 32 is exposed at the top all around the sump and is conveniently accessible for varying and controlling its heat-insulating capacity by increasing or decreasing the amount of dust coal surrounding the brickwork structure 18.

The method of the invention, as practiced in the apparatus illustrated in the drawings, will be described as applied to the condensation of zinc vapor derived in a continuous stream from a smelting or reducing furnace. While, like other zinc condensers, the condenser of the invention requires for the most efficient operation a substantially constant volume, uniform composition and constant initial temperature of gas, the condenser of the invention permits not only an unusually wide latitude in these factors for a given setting, but also permits an unusually wide latitude in its setting for a given volume, composition and initial temperature of gas.

The gaseous stream passes directly from the reduction furnace through the inlet orifice 17 into the condensing chamber 10. In this chamber the zinc vapor is rapidly cooled to below its dew point but above the freezing point of zinc. A large proportion of the zinc vapor is here condensed, and the molten zinc metal flows down the inclined bottom 12 of the chamber into the condensing sump 11.

The rapid cooling of the zinc vapor in the condensing chamber 10 is one of the characteristics features of the invention. Rapid cooling has heretofore been avoided in zinc condensation since, in the heretofore known condenser structures, it has accentuated the formation of blue powder and the loss of zinc as mist. In accordance with the present invention, rapid cooling is emphasized and carried to a point just short of the freezing point of zinc, and the zinc mist is thrown down by the baffles which cause turbulence and impingement.

The contemplated rapid cooling of the zinc vapor is accomplished in the apparatus of the invention by constructing the walls of the condensing chamber of good heat conducting material, such as silicon carbide, by providing adequate heat dissipation surface area, and by evenly extracting heat from all portions of the gas stream. The rate of heat dissipation from the condensing chamber should be susceptible of convenient control in order to compensate for changes in operating conditions, such as changes in the temperature and zinc content of the entering gases. In effect, this amounts to controlling the operating temperature within the condensing chamber, and is most conveniently accomplished in the apparatus of the invention by surrounding the bottom and/or side walls (12 and 13) of the condensing chamber with a loosely laid and readily alterable layer of heat insulating brick.

The heat dissipation from the condenser chamber and the sump may likewise be increased if necessary by varying the distance to which the ends of the baffles project from the condenser structure and/or by varying the width of these projecting ends, by adding fillets or otherwise. The ends of these baffles act as heat dissipating fins, when not covered by the heat insulating layer of dust coal. An increase in the projection of the baffles may be brought about either by increasing their length or by lifting them up above their normal position. It should be understood that this last expedient may also change the length of the gas-path, a factor hereinafter discussed.

Turbulence and impingement of the gaseous stream in its travel through the condensing chamber 10 results from the arrangement of the baffles 24. These baffles cause the gaseous stream to take a tortuous side-to-side path in its passage through the condensing chamber. The baffles 24 are made of good heat conducting material, such as silicon carbide, and serve not only as condensing surfaces for the zinc but also to readily conduct heat from the interior of the chamber to the heat dissipating surfaces thereof. It will be noted that the condensed molten zinc flows from the condensing chamber by a relatively much shorter path than that taken by the gaseous stream.

In the condensing sump 11, the gaseous stream is caused by the baffles 29 to pursue a tortuous side-to-side path. The baffles are made of good heat conducting material so as to readily convey heat from the interior of the sump to the heat dissipating surfaces thereof. Heat dissipation from the sump, however, is relatively much slower than from the condensing chamber 10. This is brought about by the relatively thick layer of heat insulating material (dust coal) surrounding the sump. Hence, the cooling of the zinc vapor in the sump takes place at a relatively slower rate than in the condensing chamber 10. Control of the rate of heat dissipation from the sump, and consequently of the operating temperature within the sump, is effected by increasing or decreasing the amount of the heat insulating layer of dust coal surrounding the sump above the level of the molten zinc metal therein.

The molten zinc metal condensing in both the condensing chamber 10 and the sump 11 accumulates in the sump, and is withdrawn from time to time through the tap hole 21. The spent gaseous stream exhausts from the sump through the stack 22 to the atmosphere, where the carbon monoxide gas burns to carbon dioxide. The character of this burning flame of the spent exhausting gases gives the skilled operator an accurate indication of the operating efficiency of the condenser.

The condenser operates on the down-draft principle and the condensed zinc metal flows through both teeth condenser chamber 10 and the condensing sump 11 concurrent with the gaseous stream, but by a relatively shorter path. Thus, scattered zinc droplets in those portions of the gaseous stream which are relatively dilute with respect to zinc are caught and coalesced into the body of molten zinc metal.

Accurate regulation and control of the temperature and pressure within the condenser is necessary in order to obtain maximum condensation efficiency. The gaseous stream entering the condensing chamber 10 through the inlet 17 will normally have a temperature of 800–900° C.; 850° C. being a fair average for this temperature. In accordance with the invention, this gaseous stream is rapidly cooled in the condensing chamber 10 to a temperature of from 550–650° C. The drop in temperature of the gaseous stream from the inlet to the outlet ends of the sump 11 is ordinarily not very great, averaging perhaps 50–100° C. The temperature of the spent gaseous stream at the base of the stack 22 should be approximately 550° C., or say between 500–600° C. In operation, it is desirable to indicate and also to continuously record the temperatures at the inlet end of the condensing chamber 10 and at the base of the stack 22. Regulation and control of the temperatures within the condenser, to maintain the contemplated operating temperatures thereof, is effected by varying the amount of heat insulating material surrounding the condensing chamber 10, or the condensing sump 11, or both.

A certain slight positive pressure above that of the atmosphere must be maintained within the condenser. The stack draft effect of a vertical reducing retort creates a certain positive pressure in the associated condenser, but the condenser stack 22 tends to diminish this pressure. The upper or gas exit end of the stack 22 is considerably higher, say 10 to 15 feet, than the gas inlet end of the condensing chamber 10. Such a relatively high condenser stack aids the down draft through both the condensing chamber and the sump during normal operation and maintains the down draft whenever the pressure at the gas inlet of the condenser is relieved. The establishment and control of the desired normal positive pressure within the condenser may be conveniently effected by throttling or restricting the effect of the draft created by the condenser stack 22. Thus, the upper or gas exit end of the stack 22 may be partially closed by an adjustable tile 40, or by any other convenient means, whereby the pressure within the condenser may be conveniently regulated and controlled by adjustment of the area of the effective outlet of the stack. The pressure within the condenser must not be so high that a positive pressure, above that of the atmosphere, is created at the bottom of the reducing or smelting apparatus. In my present preferred practice, a pressure of from 0.1 to 0.4 inches of water at the base of the stack 22 insures satisfactory pressure conditions within the condenser as a whole. In practice, it is desirable to indicate and continuously record the pressure at the base of the stack, so that the operator may adjust the tile 40 on top of the stack to maintain the proper pressure within the condenser.

The function of the condenser stack, however, is chiefly to maintain a down-draft in the condensing chamber and sump when the pressure forcing the gases from the zinc-producing vertical retort (or equivalent apparatus) into the condenser is interrupted by opening the top of the retort for the purpose of inserting a fresh batch of charge. The maintenance of draft by the stack prevents air from being sucked into the condenser through the outlet for the exhaust gases by reversal of draft. The stack may be replaced by a fan, or by a blower, or by appropriate means for closing the gas exit of the condenser when necessary, or by providing a sufficiently large reservoir of the exhaust gases (into which the condenser gas exist) especially where these gases are to be economically utilized. Neither the stack nor alternatives therefor are necessary if no interruptions occur to the supply of gases to the condenser.

Due to the presence of the baffles in the condenser chamber and sump, the path of the gas is longer than the path of the molten metal. The operation of the condenser may be regulated by varying the length and/or cross-section of the gas path. This may be effected by various means, for example: (a) By varying the distance between baffles; (b) By varying the number of baffles, e. g., by removing some of the baffles near the outlet end of the sump; (c) By varying the width of the baffles (which may be done by inserting fillets alongside the original baffles), a measure equivalent to varying the degree to which the baffles are staggered; (d) By lifting the baffles part way out of the condenser structure, so that their lower ends clear the metal bath, permitting part of the gases to flow beneath them, thus in effect opening a shorter path for part of the gases.

The condenser according to the invention is, as will be apparent to the expert in the art, so constructed that these alterations may be readily made so as to adjust the condenser to a change in the operation of the retort to which it is attached (for example, a change in the charge such as a change in the burden or the type of ore smelted). This flexibility is one of the advantageous and novel features of the invention.

A condenser operating continuously to condense zinc vapor out of a continuously supplied gaseous stream inevitably accumulates blue powder, due to the dissociation of carbon monoxide into carbon and carbon dioxide hereinbefore mentioned, and provision should therefore be made for the regular removal of blue powder without interrupting the supply of zinc vapor and while inhibiting the entrance of air into the condenser. In accordance with the invention, the formation of blue powder is minimized by avoiding equilibrium conditions in the dissociation reaction of carbon monoxide, by the absence of any catalyst, such as iron, and by cooling the zinc vapor as rapidly as possible, particularly in the first stage of condensation where the rates of reaction are faster than at lower temperatures. Furthermore, the condenser of the invention is free from constricted passageways and orifices which always block up with the inevitable blue powder, and embodies ample provision for the removal of such blue powder as forms therein. Thus, the condenser is provided with clean-out openings positioned to facilitate thorough cleaning of the entire length of its smooth floors. After each tap of molten metal, the floor of the sump 11 is scraped and cleaned by appropriate tools inserted and worked through the tap hole 21, and the accumulated blue powder is removed through the tap hole. At suitable intervals, the inclined floor of the condensing chamber 10 is scraped and cleaned by appropriate tools inserted and worked through a clean-out opening normally closed by suitably luted loose brick 41. The orifice 20 and the passage 23 are cleaned when necessary through the openings 28 and 38, respectively, and the floor 36, at the base of the stack is cleaned by removing the loose brick 37.

As will be obvious to the expert in the art, various modifications may be made in the details described above without departing from the spirit of the invention. Thus two or more condensing chambers, similar to the one described, may be arranged in series. Likewise, the condensing sump need not slope downward, but may slope upward; in such case the metal will collect in the end next the orifice between the condensing chamber and the condensing sump, and the tapping hole must be placed at that end of the sump. While the condensing chamber and sump may be combined in one unit, it is advantageous, from an operating standpoint, that the condensing chamber and sump be individual compartments or units susceptible of independent heat dissipating control. A further modification, within the scope of the invention, is to provide one condensing sump for a plurality of condensing chambers in parallel, each connected to a different retort.

Briefly summarizing the foregoing description of my improved method of zinc condensation, it may be said that the method in its complete aspect comprises continuously passing a gaseous stream containing zinc vapor through a two-stage condenser maintained at the proper temperature and pressure and in such a manner that:

1. Heat is extracted very rapidly but evenly throughout the gas stream in the first stage, but more slowly in the second stage where danger of solidifying the zinc is greater and speed of the oxidizing reaction is less.

2. The gases are forced to pass through a relatively long path in comparison with the distance from the center of the stream to the condenser wall.

3. A condition of turbulence is maintained in the gas stream to aid in bringing all parts of the gas in contact with the condenser walls and to extract heat evenly from all portions of the gas stream.

4. The gases repeatedly impinge on the walls and baffles of the condenser.

5. The path of the molten metal is short in comparison with the path of the vapors, which is desirable.

6. The direction of flow of the molten metal in the condensing chamber is the same as the direction of flow of the zinc laden gases. This aids in washing the condensed zinc droplets from the floors.

7. The mass of molten metal is collected in the condenser where it is needed to aid coalescence of the droplets of molten zinc.

8. No constricted passageways or orifices are present to block up with blue powder.

9. All parts of the condenser, especially the lower parts, can be easily cleaned without dismantling the condenser or of interfering with its condensing action.

10. No air is permitted to leak into the condenser at any point.

The relatively long gas path makes it possible to cool the gases to the desired temperature without having the condenser walls and surfaces at such a low temperature that large amounts of blue powder are formed. The turbulence and repeated impingement aid in this way also, facilitate the transfer of heat and make it possible to remove suspended mist or droplets of zinc from the gas stream.

The following example is given, merely by way of illustration and with no intention of restricting or limiting the invention, of the construction and operation of a condenser according to the principles of the invention. The condenser was constructed to treat a continuously supplied gaseous stream delivering 6,000 pounds of zinc vapor per day of 24 hours. Since the condensing efficiency was approximately 90%, the capacity of the condenser was 5,300 pounds of condensed zinc metal per day. A summary of the essential data of the condenser follows:

| | |
|---|---|
| Heat dissipating surface of condensing chamber 10 | 31.6 sq. ft. |
| Heat dissipating surface of downleg orifice 20 | 5.0 sq. ft. |
| Heat dissipating surface of sump 11 | 33.7 sq. ft. |
| Condensing surface of chamber 10 | 46.3 sq. ft. |
| Condensing surface of orifice 20 | 5 sq. ft. |
| Condensing surface of sump 11 | 81.4 sq. ft. |
| Inside dimensions of chamber 10 | 18″ x 18″ x 62″ |
| Inside dimensions of orifice 20 | 13½″ x 14″ x 13″ high |
| Inside dimensions of sump | 7″ radius, total height at entrance, 2′-1¼″; total height at exit, 1′-8¼″; length 8′-3″ |
| Number of baffles in chamber 10 | 6 |
| Size of baffles in chamber 10 | 1½″ x 12″ x 15″ |
| Area per baffle in chamber 10 | 2.45 sq. ft. |
| Spacing of baffles in chamber 10 | 3″ from floor, 6″ from side wall, 6″ between baffles |
| Number of baffles in sump 11 | 10 |
| Size of baffles in sump 11 | 2″ x 10″ x 19¾″ long (average length) |
| Area per baffle in sump 11 | 3.15 sq. ft. |
| Spacing of baffles in sump 11 | 3″ from floor, 4″ from side wall, 4″ between baffles |
| Theoretical velocity at start of baffles in chamber 10 | 3.9 ft./sec. |
| Theoretical velocity between baffles in chamber 10 | 5.8 ft./sec. |
| Theoretical velocity at start of first baffle in sump 11 | 4.3 ft./sec. |
| Theoretical velocity at finish of last baffle in sump 11 | 4.3 ft./sec. |
| Average theoretical velocity between baffles in sump 11 | 4.7 ft./sec. |
| Ratio of condensing surface to heat dissipating surface of chamber 10 and orifice 20 | $=\frac{51.3}{36.6}=1.41$ |
| Ratio of condensing surface to heat dissipating surface of sump 11 | $=\frac{81.4}{33.7}=2.42$ |
| Ratio of condensing surface to heat dissipating surface of overall condenser | $=\frac{132.6}{70.3}=1.89$ |

The heat dissipating surface is the inner surface of that part of the condenser whose outer surface is exposed to the air and does not include the baffles or the inverted arch portion of the sump. The baffles are within the condenser and must dissipate heat through the surface exposed to the air. The inverted arch portion of the sump is insulated in loam and dust coal and for all practical purposes does not dissipate heat. The condensing surface, as the name implies, is the total surface upon which zinc can condense. Both surfaces are important and have a relationship to each other which is expressed in the foregoing summary as the ratio of condensing surface to heat dissipating surface. While this ratio may be influenced by the heat conductivity of the material of which the condenser is made, my investigations indicate that with good heat conducting material such as silicon carbide, the area of the condensing surface should be from 1.8 to 2.0 times the area of the heat dissipating surface for good condensation efficiency.

The condenser of the invention is remarkably flexible. Thus, while the condenser hereinbefore specifically summarized is intended to handle 6,000 pounds of zinc vapor per day, it has been operated with complete satisfaction, by appropriate temperature, pressure and chemical control, in the condensation of 1,500 pounds of zinc vapor per day. While the condenser is especially adapted to treat a gaseous stream relatively rich in zinc vapor, for example 50% carbon monoxide and 50% zinc vapor, it operates satisfactorily on gaseous streams relatively dilute or rich in zinc vapor.

I claim:

1. The method of condensing zinc vapor which comprises passing a gaseous stream containing zinc vapor through a condensing chamber in a tortuous side-to-side path and removing heat rapidly so that a large proportion of the zinc vapor is condensed, then passing the gaseous stream through a condensing sump in a tortuous side-to-side path and removing heat slowly so that substantially all of the remaining zinc vapor is condensed, permitting the condensed molten zinc to flow through said condensing chamber concurrent with the gaseous stream but by a relatively shorter path into said condensing sump, and periodically withdrawing from the condensing sump the molten zinc accumulating therein.

2. The method of condensing zinc vapor which comprises passing a gaseous stream containing zinc vapor through a condensing chamber in a tortuous side-to-side path and under such conditions of heat dissipation that the zinc vapor is rapidly cooled to below its dew point but insufficiently to cause solidification of molten zinc whereby a large proportion of the zinc vapor is condensed, then passing the gaseous stream through a condensing sump in a tortuous side-to-side path under such conditions of heat dissipation that the remaining zinc vapor is subjected to relatively slower cooling, permitting the condensed molten zinc to flow through said condensing chamber concurrent with the gaseous stream but by a relatively shorter path into said condensing sump, and periodically withdrawing from the relatively cooler end of the condensing sump the molten zinc accumulating therein, the flow of molten zinc through the condensing sump being concurrent with the gaseous stream but by a relatively shorter path.

3. The method of condensing zinc vapor which comprises passing a gaseous stream containing zinc vapor through an environment adapted to cause turbulence and impingement of the gaseous stream and in which the zinc vapor is rapidly cooled to below its dew point but insufficient to cause solidification of molten zinc and in which the condensed molten zinc flows concurrent with the gaseous stream, then passing the gaseous stream lean in zinc vapor through a second environment adapted to cause turbulence and impingement thereof and in which the remaining zinc vapor is subjected to relatively slower cooling, and collecting in the second environment the molten zinc condensed in both environments.

4. The method of condensing zinc vapor which comprises subjecting a gaseous stream containing zinc vapor to a two-stage condensing treatment in the first of which the gaseous stream is rapidly cooled with the condensation of a large proportion of the zinc vapor and in the second of which the gaseous stream is more slowly cooled, the gaseous stream being subjected to turbulence and impingement in each of said stages and the condensed molten zinc flowing concurrent with the gaseous stream but by a relatively shorter path to a collecting sump in the second stage condensing treatment.

5. The method of condensing zinc vapor which comprises passing a gaseous stream containing zinc vapor through a down-draft condensing chamber in a tortuous side-to-side path and under such conditions of heat dissipation that a large proportion of the zinc vapor is condensed, permitting the condensed molten zinc to flow through said chamber concurrent with the gaseous stream but by a relatively shorter path into a collecting sump, and exhausting the spent gaseous stream from the collecting sump at a sufficient elevation with respect to the gaseous inlet of said condensing chamber to maintain the down-draft through said chamber.

6. The method of condensing zinc vapor which comprises passing a gaseous stream containing zinc vapor through a down-draft condensing chamber in a tortuous side-to-side path and under such conditions of heat dissipation that a large proportion of the zinc vapor is condensed, then passing the gaseous stream through a condensing sump in a tortuous side-to-side path under such conditions of heat dissipation that substantially all of the remaining zinc vapor is condensed, and exhausting the spent gaseous stream from the condensing sump at a sufficient elevation with respect to the gaseous inlet of said condensing chamber to maintain the down-draft through said chamber.

7. The method of condensing zinc vapor which comprises passing a gaseous stream containing zinc vapor through a down-draft condensing chamber in a tortuous side-to-side path and under such conditions of heat dissipation that a large proportion of the zinc vapor is condensed, then passing the gaseous stream through a condensing sump in a tortuous side-to-side path under such conditions of heat dissipation that substantially all of the remaining zinc vapor is condensed, permitting the condensed molten zinc to flow through said condensing chamber concurrent with the gaseous stream but by a relatively shorter path into said condensing sump, and exhausting the spent gaseous stream from the condensing sump at a sufficient elevation with respect to the gaseous inlet of said condensing chamber to maintain the down-draft through said chamber.

8. The method of condensing zinc vapor which comprises passing a gaseous stream containing zinc vapor through a down-draft condensing chamber in a tortuous side-to-side path and under such conditions of heat dissipation that the zinc vapor is rapidly cooled to below its dew point but insufficient to cause solidification of molten zinc whereby a large proportion of the zinc vapor is condensed, then passing the gaseous stream through a condensing sump in a tortuous side-to-side path under such conditions of heat dissipation that the remaining zinc vapor is subjected to relatively slower cooling, permitting the condensed molten zinc to flow through said condensing chamber concurrent with the gaseous stream but by a relatively shorter path into said condensing sump, periodically withdrawing from the relatively cooler end of the condensing sump the molten zinc accumulating therein, the flow of molten zinc through the condensing sump being concurrent with the gaseous stream but by a relatively shorter path, and exhausting the spent gaseous stream from the condensing sump at a sufficient elevation with respect to the gaseous inlet of said condensing chamber to maintain the down-draft through said chamber.

9. The method of condensing zinc vapor which comprises passing a gaseous stream containing zinc vapor through a down-draft condensing chamber in which the gaseous stream is subjected to turbulence and impingement and the zinc vapor is rapidly cooled to below its dew point but insufficient to cause solidification of molten zinc, whereby a large proportion of the zinc vapor is condensed to molten zinc, permitting the condensed molten zinc to flow through said chamber into a collecting sump by a relatively shorter path than taken by the main portion of the gaseous stream, and controlling the heat dissipated from said chamber by varying the amount of heat insulaion thermally associated with the chamber.

10. In an apparatus for condensing zinc vapor, an inclined condensing chamber, and a plurality of vertically adjustable spaced baffles extending through the roof of said chamber into the interior thereof and providing a tortuous side-to-side gas path through the chamber.

11. In an apparatus for condensing zinc vapor, an inclined condensing chamber, a plurality of spaced baffles extending from the roof of said chamber into proximity with but not entirely to the bottom thereof and proportioned and arranged to provide a tortuous side-to-side gas path through the chamber, and variable heat insulating means thermally associated with said chamber.

12. In an apparatus for condensing zinc vapor, a condensing chamber, and a plurality of vertically adjustable spaced baffles extending through the roof of said chamber into proximity with but not entirely to the bottom thereof and proportioned and arranged to provide a tortuous side-to-side gas path through the chamber.

13. In an apparatus for condensing zinc vapors, a condensing chamber, a plurality of spaced baffles arranged within said chamber to provide a tortuous side-to-side gas path through the chamber, and variable heat insulating means thermally associated with said chamber.

14. An apparatus for condensing zinc vapor comprising an inclined condensing chamber, a plurality of vertically adjustable spaced baffles extending from the top of said chamber into proximity with but not entirely to the bottom thereof, said baffles being narrower than the width of said chamber and alternate baffles being staggered with respect to the other baffles to provide a tortuous side-to-side gas path through the chamber, and means adapted to continuously receive the molten metal condensed in said chamber.

15. An apparatus for condensing zinc vapor comprising a condensing chamber, a plurality of spaced baffles arranged in said chamber to provide a tortuous side-to-side gas path therethrough while permitting the flow of condensed molten metal through the chamber by a relatively shorter path, a sump separated from but operatively associated with said chamber and adapted to continuously receive molten metal condensed in and flowing from the chamber as well as gas exiting therefrom, and baffles arranged in said sump to provide a tortuous gas path therethrough.

16. An apparatus for condensing zinc vapor comprising an inclined condensing chamber, a plurality of spaced baffles extending from the top of said chamber into proximity with but not entirely to the bottom thereof, said baffles being narrower than the width of said chamber and alternate baffles being staggered with respect to the other baffles to provide a tortuous side-to-side gas path through the chamber, a sump arranged below said chamber and adapted to continuously receive molten metal condensed in the chamber as well as gas exiting therefrom, and baffles arranged in said sump to provide a tortuous gas path therethrough.

17. An apparatus for condensing zinc vapor comprising a condensing chamber, a plurality of spaced baffles arranged in said chamber to provide a tortuous gas path therethrough while permitting the flow of condensed molten metal through the chamber by a relatively shorter path, a sump arranged below said chamber and adapted to continuously receive molten metal condensed in the chamber as well as gas exiting therefrom, and a plurality of spaced baffles extending from the top of said sump into proximity with but not entirely to the bottom thereof and arranged to provide a tortuous side-to-side gas path therethrough.

18. An apparatus for condensing zinc vapor comprising a condensing chamber, a plurality of spaced baffles arranged in said chamber to provide a tortuous gas path therethrough while permitting the flow of condensed molten metal through the chamber by a relatively shorter path, a sump having a concave bottom arranged below said chamber and adapted to continuously receive molten metal condensed in the chamber as well as gas exiting therefrom, and a plurality of spaced baffles arranged in said sump to provide a tortuous gas path therethrough while permitting the flow of molten metal through the sump by a relatively shorter path.

19. An apparatus for condensing zinc vapor comprising an inclined condensing chamber, a plurality of spaced baffles extending from the top of said chamber into proximity with but not entirely to the bottom thereof, said baffles being narrower than the width of said chamber and alternate baffles being staggered with respect to the other baffles to provide a tortuous side-to-side gas path through the chamber, a sump having a concave bottom arranged below said chamber and adapted to continuously receive molten metal condensed in the chamber as well as gas exiting therefrom, and a plurality of spaced baffles extending from the top of said sump into proximity with but not entirely to the bottom thereof and arranged to provide a tortuous side-to-side gas path therethrough while permitting the flow of molten metal through the sump by a relatively shorter path.

20. An apparatus for condensing zinc vapor comprising a chamber having a substantially flat bottom inclined downwardly from its gas-inlet end to its gas-outlet end, a plurality of spaced baffles arranged in said chamber to provide a tortuous gas path therethrough while permitting the flow of condensed molten metal along the flat bottom of the chamber, means whereby the entire surface of said flat bottom may be scraped and cleaned with appropriate tools worked through one end of the chamber, and means adapted to continuously receive molten metal condensed in said chamber.

21. An apparatus for condensing zinc vapor comprising a condensing chamber, a sump arranged below said chamber and adapted to continuously receive molten metal condensed in the chamber as well as gas exiting therefrom, a plurality of spaced baffles arranged in said sump to provide a tortuous gas path therethrough while permitting the flow of molten metal along the bottom of the sump, and means whereby the entire bottom surface of the sump may be scraped and cleaned with appropriate tools worked through the end of the sump.

22. In an apparatus for condensing zinc vapor, a condensing chamber, a plurality of spaced baffles extending from the roof of said chamber into proximity with but not entirely to the bottom thereof and proportioned and arranged to provide a tortuous side-to-side gas path through the chamber, and means whereby the entire bottom surface of said chamber may be scraped and cleaned with appropriate tools worked through one end thereof.

23. An apparatus for condensing zinc vapor comprising a chamber having a substantially flat bottom inclined downwardly from its gas-inlet end to its gas-outlet end, a plurality of spaced baffles extending from the top of said chamber into proximity with but not entirely to the bottom thereof, said baffles being narrower than the width of said chamber and alternate baffles being staggered with respect to the other baffles to provide a tortuous side-to-side gas path through the chamber, a sump having a concave bottom arranged below said chamber and adapted to continuously receive molten metal condensed in the chamber as well as gas exiting therefrom, and a plurality of spaced baffles extending from the top of said sump into proximity with but not entirely to the bottom thereof and arranged to provide a tortuous side-to-side gas path therethrough while permitting the flow of molten metal through the sump by a relatively shorter path.

24. An apparatus for condensing zinc vapor comprising a condensing chamber, a plurality of spaced baffles arranged in said chamber to provide a tortuous gas path therethrough while permitting the flow of condensed molten metal through the chamber by a relatively shorter path, a sump arranged below said chamber and adapted to continuously receive molten metal condensed in the chamber as well as gas exiting therefrom, a plurality of spaced baffles arranged in said sump to provide a tortuous gas path therethrough while permitting the flow of molten metal through the sump by a relatively shorter path, and a stack communicating with the gas-exiting end of said sump and adapted to exhaust the exiting gas at an elevation considerably higher than the gas-inlet end of said chamber.

25. An apparatus for condensing zinc vapor comprising a chamber having a substantially flat bottom inclined downwardly from its gas-inlet end to its gas-outlet end, a plurality of spaced baffles arranged in said chamber to provide a tortuous gas path therethrough while permitting the flow of condensed molten metal along the flat bottom of the chamber, a sump having a concave bottom arranged below said chamber and adapted to continuously receive molten metal condensed in the chamber as well as gas exiting therefrom, a plurality of spaced baffles arranged in said sump to provide a tortuous gas path therethrough while permitting the flow of molten metal through the sump by a relatively shorter path, and a stack communicating with the gas-exiting end of said sump and adapted to exhaust the exiting gas at an elevation considerably higher than the gas-inlet end of said chamber.

26. An apparatus for condensing zinc vapor comprising a condensing chamber, a sump separate from and arranged below said chamber and adapted to continuously receive molten metal condensed in the chamber as well as gas exiting therefrom, and variable heat insulating means operatively associated with both said chamber and said sump.

27. An apparatus for condensing zinc vapor comprising a condensing chamber, a sump arranged below said chamber and adapted to continuously receive molten metal condensed in the chamber as well as gas exiting therefrom, a plurality of spaced baffles arranged in said sump to provide a tortuous gas path therethrough while permitting the flow of molten metal through the sump by a relatively shorter path, and variable heat insulating means operatively associated with at least a part of the exterior heat dissipating surface of said sump.

28. An apparatus for condensing zinc vapor comprising a condensing chamber, a sump having a concave bottom arranged below said chamber and adapted to continuously receive molten metal condensed in the chamber as well as gas exiting therefrom, a plurality of spaced baffles extending from the top of said sump into proximity with but not entirely to the bottom thereof and arranged to provide a tortuous side-to-side gas path therethrough while permitting the flow of molten metal through the sump by a relatively shorter path, the concave bottom of said sump being so insulated that substantially no heat is dissipated from its exterior surface, and variable heat insulating means operatively associated with at least a part of the remaining exterior surface of the sump.

29. An apparatus for condensing zinc vapor comprising a condensing chamber having a plurality of vertically adjustable spaced baffles arranged to provide a tortuous gas path therethrough, the area of the condensing surface within said chamber being somewhat greater but substantially less than twice the area of the heat dissipating surface of the chamber.

30. An apparatus for condensing zinc vapor comprising a condensing chamber, a sump operatively associated with said chamber and adapted to continuously receive molten metal condensed in the chamber as well as gas exiting therefrom and having a plurality of spaced baffles arranged to provide a tortuous gas path therethrough, the area of the condensing surface within said sump being at least twice the area of the heat dissipating surface of the sump.

31. An apparatus for condensing zinc vapor comprising a condensing chamber having a plurality of spaced baffles arranged to provide a tortuous gas path therethrough, and a sump arranged below said chamber and adapted to continuously receive molten metal condensed in the chamber as well as gas exiting therefrom and having a plurality of spaced baffles arranged to provide a tortuous gas path therethrough, the area of the condensing surfaces of the combined chamber and sump being about 1.8 to 2 times the area of the heat dissipating surfaces of the combined chamber and sump.

32. In a method of condensing zinc vapor, the steps which comprise subjecting a gaseous stream containing zinc vapor to a two-stage condensing action, the zinc vapor first being promptly cooled from its highly elevated temperature to a temperature at which a substantial portion of the available zinc is condensed to molten zinc, and then subjecting the gaseous stream containing the remaining uncondensed zinc vapor to another condensing action in which the vapor is gently cooled within a narrow temperature range to condense the remaining zinc.

33. Process of condensing zinc vapor according to the preceding claim, in which regulation of the heat dissipation of the condensing chamber is effected by increasing or decreasing the degree to which vertically adjusted baffles project from the chamber.

In testimony whereof I affix my signature.

EARL H. BUNCE.